United States Patent [19]

Noji et al.

[11] Patent Number: 5,157,932
[45] Date of Patent: Oct. 27, 1992

[54] AIR CONDITIONER FOR VEHICLE

[75] Inventors: Ikutaro Noji; Nobuyuki Kawai, both of Kanagawa, Japan

[73] Assignee: Nissan Motor Co., Ltd., Yokohama, Japan

[21] Appl. No.: 731,486

[22] Filed: Jul. 17, 1991

[30] Foreign Application Priority Data

Jul. 19, 1990 [JP] Japan .................. 2-193750

[51] Int. Cl.⁵ ............................................ G05D 15/00
[52] U.S. Cl. .................... 62/126; 236/78 D; 236/94
[58] Field of Search ............ 165/11.1; 62/126; 236/78 D, 94; 237/12, 3 B

[56] References Cited

U.S. PATENT DOCUMENTS

| | | | |
|---|---|---|---|
| 4,858,824 | 8/1989 | Matsuda et al. | 236/94 |
| 4,925,089 | 5/1990 | Chaparro et al. | 236/78 D |
| 5,078,316 | 1/1992 | Hara et al. | 236/94 |

FOREIGN PATENT DOCUMENTS 1-254418  10/1989  Japan .

Primary Examiner—William Wayner
Attorney, Agent, or Firm—Foley & Lardner

[57] ABSTRACT

An automatic air conditioner for a vehicle comprising a cooling unit, heater and a blower fan which are controlled by a control circuit. The air conditioner is arranged to adjust a compartment temperature to a target value set by a target value setting means. Furthermore, the air conditioner has functions such as a quick cooling, a quick heating and a low water-temperature drive control to quickly adjust the compartment temperature to the target value. The air conditioner further includes a function wherein the change of the preset target value is forbidden in operation of the quick cooling, the quick heating and the low water-temperature drive controls to prevent the compartment from being over-cooled or over-heated by the change of the target value in the operation.

9 Claims, 5 Drawing Sheets

AIR CONDITIONER FOR VEHICLE

BACKGROUND OF THE INVENTION

1. Field of the Invention

The present invention relates to improvements in an automatic air conditioner for a vehicle.

2. Description of the Prior Art

It is well known that an automatic air conditioner has a function of a cooling down control in which the cooling down control means quickly cools down the air without reheating the air while a variable displacement refrigerant compressor is operated in a high capacity mode at a time just after an ignition switch is turned on in a summer daytime. Such an air conditioner is disclosed, for example, in Japanese Patent Provisional Publication No. 1-254418. The air conditioner is of a type in which the compartment temperature is controlled in accordance with the preset target compartment temperature. Therefore, after the compartment temperature has been lower than a predetermined value by the quick cooling down control, the compressor is controlled so that the compartment temperature is adjusted at the preset target compartment temperature.

In heating, the air conditioner is operated in a warm-up control in which an air flow rate by a blower fan and a reheated amount by a heater unit are set at maximum. After the compartment temperature has been higher than a predetermined value by the warm-up control, the reheated amount of the air is controlled so that the compartment temperature is adjusted at the preset target compartment temperature.

Furthermore, when a temperature of engine cooling water is lower than a predetermined temperature, a low water-temperature drive control is carried out in a manner that the air flow rate by the blower fan is adjusted to be lower than a predetermined value or equal to zero, until a predetermined condition is satisfied, for example, until the temperature of engine cooling water acting as a heat source in heating becomes higher than a predetermined value. After such control, the air flow rate by the blower fan is controlled so that the compartment temperature is adjusted at the preset target compartment temperature.

Such an air conditioning system faces a case in which the preset target compartment temperature is changed into a relatively low temperature in operation of the cooling down control by a passenger who intends to more quickly get a cooled compartment although the cooling speed is not accelerated by such a changing of the preset target compartment temperature.

However, when the preset target compartment temperature is set at a relatively low temperature in operation of the cooling down control, the air conditioner system operates to further cool the compartment after the cooling down control so that the compartment temperature becomes a relatively low set temperature. Accordingly, it is necessary to reset the set temperature to get an adequate temperature condition after the cooling down control, thereby losing an advantage of the auto control.

Similarly, in the warm-up control or low water-temperature drive control, it may cause a similar problem when the compartment is over warmed, thereby losing an advantage of the auto control.

SUMMARY OF THE INVENTION

It is an object of the present invention to provide an improved air conditioner in which an auto temperature control is adequately carried out while the air conditioner is of a type which has functions such as a cooling down control, a warm-up control and a lower water-temperature drive control.

As shown in FIGS. 1A to 1C, the air conditioner according to the present invention comprises quickly temperature adjusting means which includes cooling means 101 (heating means 201, blower fan 301), quick cooling commanding means 103 (quick heating commanding means 203) and cooling means regulating means 104 (heating means regulating means 204, fan regulating means 304). Furthermore, the air conditioner comprises temperature setting means 102 and set temperature control means 105 (205, 305).

The air conditioner for a vehicle in accordance with the present invention comprises target value setting means which sets a target value of a temperature in a passenger compartment. Quickly adjusting means quickly adjusts the passenger compartment temperature in accordance with the compartment temperature target value in its operative state. Control means controls the target value setting means to forbid the change of the compartment temperature target value in the operative state and to allow the change of the compartment temperature target value in the inoperative state.

With this air conditioner, since the target value set means is arranged so as to forbid the change of the target value in operation of the quick temperature adjusting means such as a quick cooling control, a quick heating or a low water-temperature drive control and to allow the change in the inoperative condition of the quick temperature adjusting means, the passenger compartment temperature is adjusted at an adequate value without over-cooling or over-heating. This operation facilitates a resetting operation even if a passenger tries to change the target value in operation of the quick temperature adjusting means. Therefore, the auto-mode control is effectively carried out.

DETAILED DESCRIPTION OF THE INVENTION

Figure 1A:
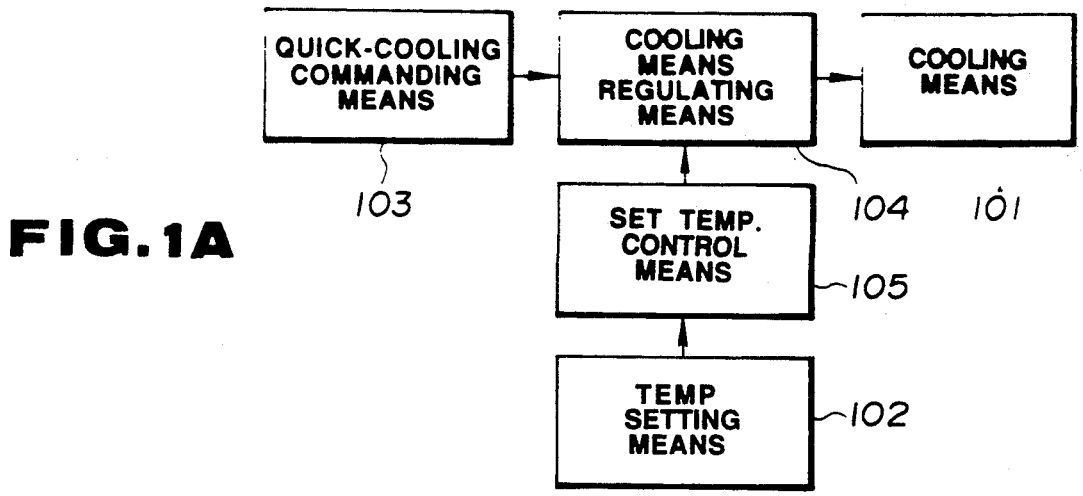
FIGS. 1A to 1C are block diagrams showing conceptual structures of an air conditioner for a vehicle in accordance with the present invention.
Figure 1B:
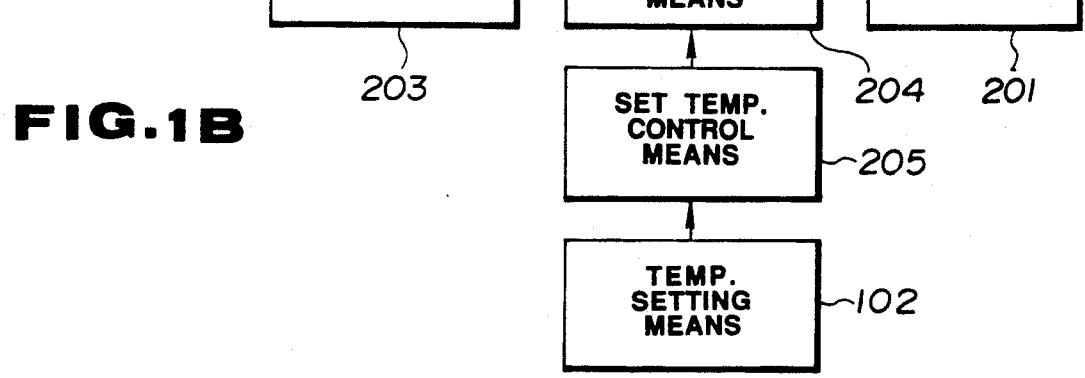
Figure 1C:
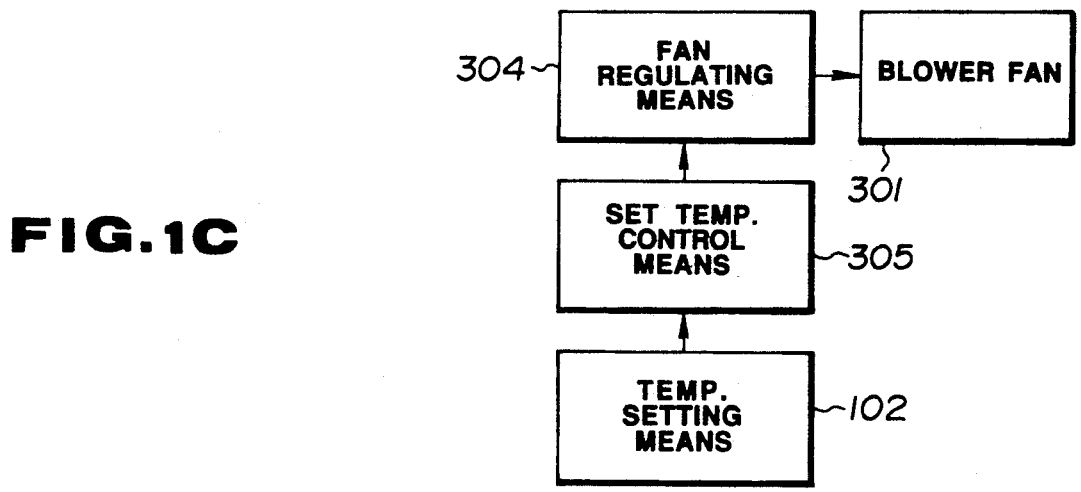
Figure 2:
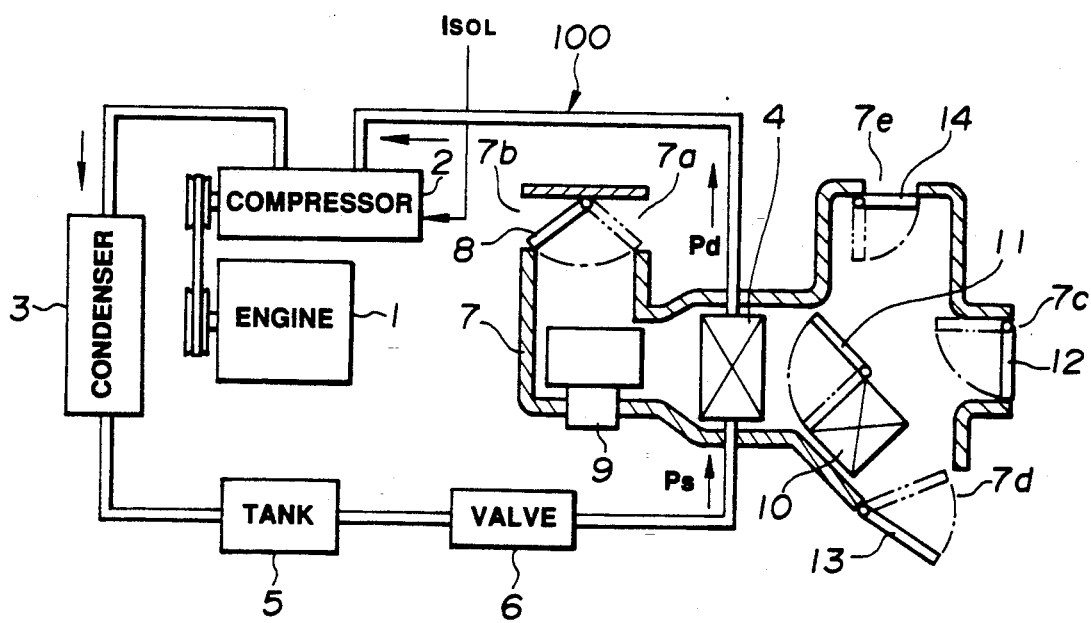
FIG. 2 is a schematic diagram showing an embodiment of the air conditioner according to the present invention.

Referring now to FIGS. 2 to 6, there is shown an embodiment of an air conditioner for use in an automotive vehicle. The air conditioner has a function of an automatic control and comprises a cooler unit 100 of a compression refrigerant type which includes a variable displacement refrigerant compressor 2, a condenser 3, an evaporator 4, a tank 5 and an expansion valve 6.

The variable displacement refrigerant compressor 2 is of the variable angle wobble plate type responsive to compressor suction and discharge pressure Ps and Pd for controlling the compressor discharge flow rate. The compressor discharge flow rate increases to provide an increasing refrigerant capacity when the compressor suction pressure Ps exceeds a predetermined value. This predetermined value is determined by a solenoid current $I_{SOL}$ which is applied to the compressor 2 from a control circuit 30. The evaporator 4 is disposed in a duct 7 having first and second inlet ports 7a and 7b which are closed or opened by an air intake door 8. A blower fan 9, a heater unit 10 and an air mixing door 11 are similarly disposed in the duct 7. The duct 7 further includes a ventilator outlet port 7c, a foot outlet port 7d and a defroster outlet port 7e. The ventilator outlet port 7c is connected to a plurality of exit openings formed in a vehicle instrument panel facing to the passengers seated on the front seats. An opening degree of the ventilator outlet port 7c is controlled by a vent door 12 in a manner so that the vent door 12 closes the ventilator outlet port 7c at a first position shown by the solid lines and opens the ventilator outlet port 7c at a second position shown by the two-dotted lines. Similarly, a foot door 13 and a defroster door 14 are operated to close and open the foot outlet port 7d and the defroster outlet port 7e, respectively.

Figure 3:
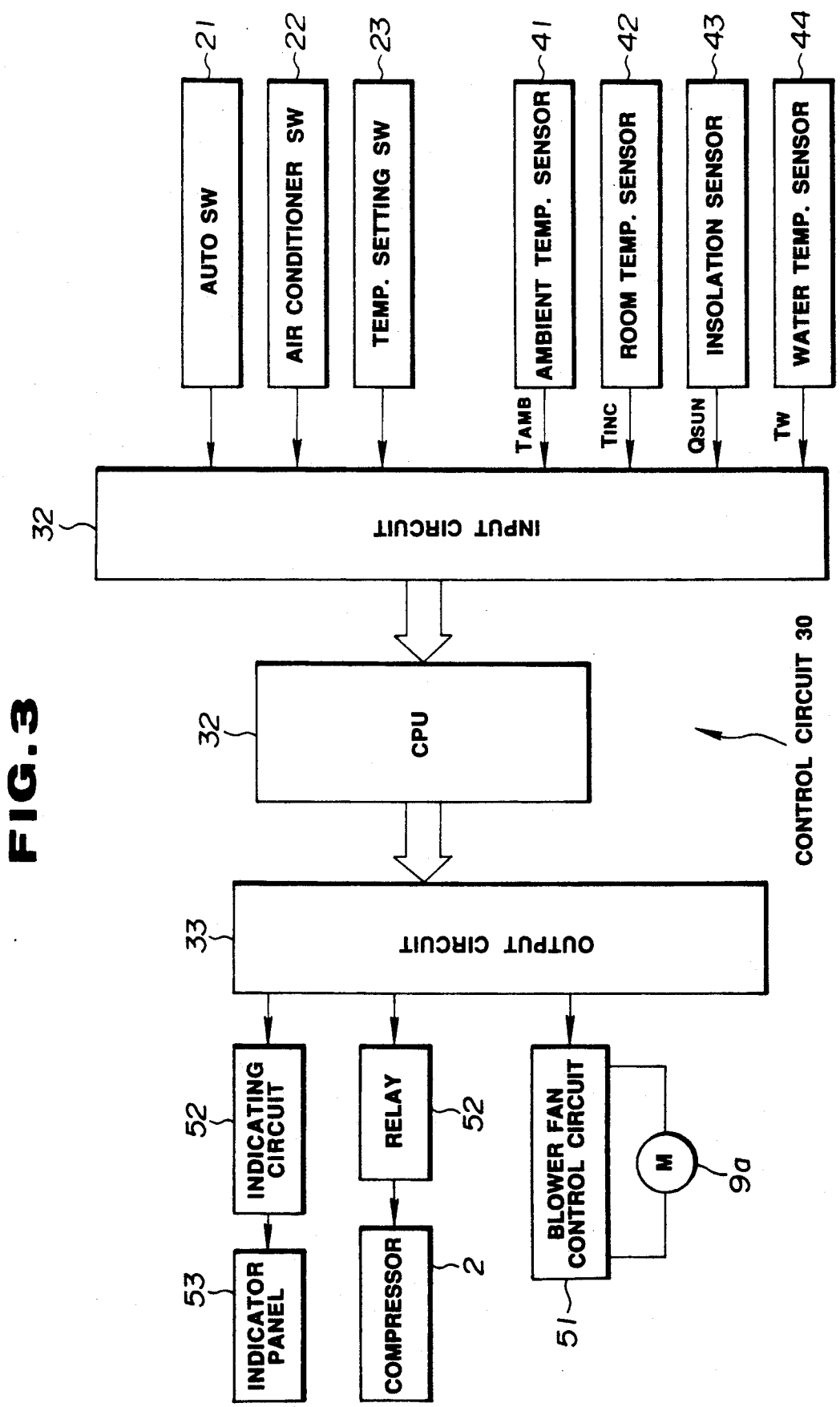
FIG. 3 is a schematic block diagram which shows a control circuit used in the air conditioner of FIG. 2.

A schematic block diagram of the control circuit 30 for controlling the air conditioner of the present invention is shown in FIG. 3. The control circuit 30 is constituted of a CPU 31 which is connected to an input circuit 32 and an output circuit 33. The input circuit 32 is electrically connected to an ambient temperature sensor 41 which detects an ambient temperature $T_{AMB}$, a compartment temperature sensor 42 which detects a compartment temperature $T_{INC}$, an insolation sensor 43 which detects an insolation amount $Q_{SUN}$, and an engine coolant sensor 44 which detects an engine coolant temperature $T_W$. The CPU 31 receives signals from the sensors 41 to 44 through the input circuit 32. The input circuit 32 is further connected to an auto switch 21 for setting the air conditioner in an auto control mode, an air conditioner switch 22 for operating the compressor 2, and a temperature set switch 23 for setting a target value of a compartment temperature in the auto mode control.

A blower fan control circuit 51 is electrically connected to the CPU 31 through the output circuit 33 and controls a blower fan 9 by applying a predetermined voltage in accordance with a signal from the CPU 31. An indicator circuit 52 is also connected to the CPU 31 through the output circuit 33 and indicates various signs in an indicator 53. For example, the indicator 53 indicates an air conditioner operating condition such as a cooling down control (a quick cooling control), a warm-up control (a quick heating control) and a low water-temperature drive control. The CPU 31 appropriately controls temperatures of various portions and a capacity of the compressor 2, and further controls rotations of a blower fan motor 9a through the blower fan 9 control circuit 51.

The manner of operation of the thus arranged air conditioner will be discussed hereinafter, with reference to a flow chart shown in FIG. 5.

Figure 5:
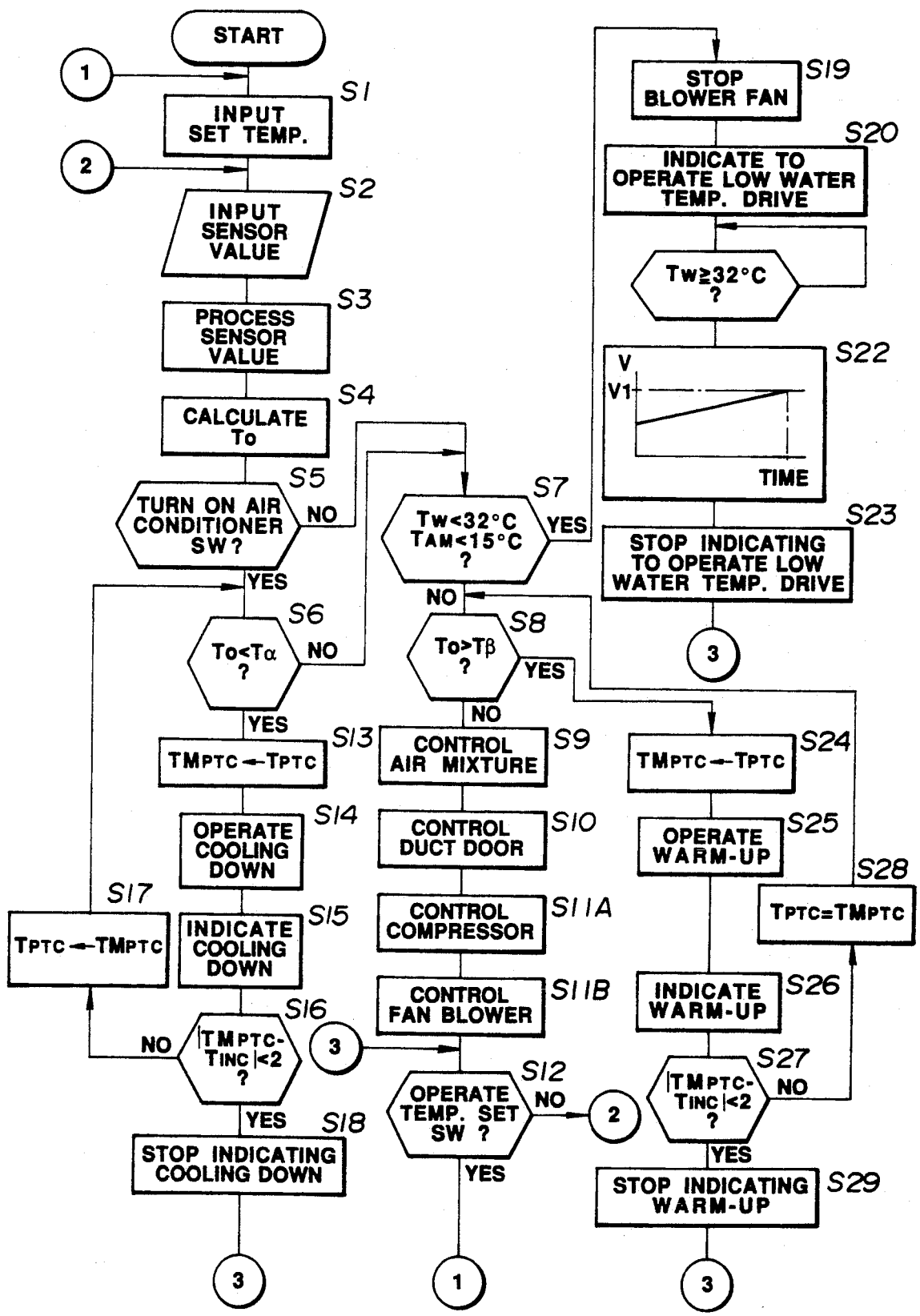
FIG. 5 is a flow chart to explain the program used in the control circuit of FIG. 3.

When the auto-mode switch 21 is turned on, the program of FIG. 5 is started. In a step S1, the CPU 31 reads a set temperature (a compartment temperature target value) $T_{PTC}$ which is determined by setting of the temperature set switch 23. In a step S2, the CPU 31 receives signals from the sensors 41 to 44. The signals from the sensors 41 to 44 are as follows: the ambient temperature sensor 41 outputs a signal indicative of the ambient temperature $T_{AMB}$, the compartment temperature sensor 42 outputs a signal indicative of a compartment temperature $T_{INC}$, the insolation sensor 43 outputs a signal indicative of the insolation amount $Q_{SUN}$, and the engine coolant sensor 44 outputs a signal indicative of the engine coolant temperature $T_W$.

In a step S3, the CPU 31 processes the input values from the sensors 41 to 44, that is, the ambient temperature $T_{AMB}$ is processed to except the effect from the other heat sources and to correspond to a real ambient temperature $T_{AM}$, and an insolation amount $Q_{SUN}$ is processed to correspond to a heat capacity $Q'_{SUN}$. The set temperature $T_{PTC}$ is processed to correspond to a supplemental value $T'_{PTC}$.

In a step S4, a target outlet temperature $T_O$ is calculated by the following equation (1):

$$T_O = (A+D)T_{PTC} + B \cdot T_{AM} + C \cdot Q'_{SUN} - D \cdot T_{INC} + E \quad (1)$$

wherein A, B, C, D and E are constant.

In a step S5, it is judged whether the air conditioner switch 22 is turned on or not, and when the air conditioner switch 22 is turned on, the program proceeds to a step S6. When the air conditioner switch 22 is not turned on, the program proceeds to a step S7. In the step S6, it is judged whether the outlet temperature $T_O$ is lower than a predetermined value $T\alpha$ or not. When the outlet temperature $T_O$ is not lower than the predetermined value $T\alpha$, the program proceeds to the step S7 wherein it is judged whether the engine coolant temperature $T_W$ is lower than 32° C. and the corrected value $T_{AM}$ is lower than 15° C., or not. When the judgement in the step S7 is "no", the program proceeds to a step S8 wherein it is judged whether the target outlet temperature $T_O$ is higher than a predetermined value $T\beta$ or not.

When the judgement in the step S8 is "no", that is, $T\alpha \leq T_O \leq T\beta$, the program proceeds to a step S9. In the step S9, an opening degree of the air mixing door 11 is controlled in accordance with the target outlet temperature $T_O$ and the program proceeds to a step 10. In the step S10, the opening degree of the duct door is controlled in accordance with the target outlet temperature $T_O$ and the program proceeds to a step S11A. In the step S11A, the compressor 2 is controlled in its cooling capacity (cooling degree) in accordance with the target outlet temperature $T_O$ and the program proceeds to a step S11B. In the step S11B, the air flow rate is generated by the blower fan 9 in accordance with the target outlet temperature $T_O$.

The opening degree of the air mixing door 11 is controlled through an air mixing door actuator (not shown). Similarly, each outlet door 12, 13, 14 is controlled through each mode door actuator (not shown). The air flow rate by the blower fan 9 is controlled by the blower fan control circuit 51 through a motor 9a. When the air conditioner switch 22 is turned off, the compressor 2 is not operated.

In a step S12, it is judged whether the temperature set switch 23 is operated or not, and when the judgement is "yes", the program returns to the step S1, and when the judgement is "no", the program returns to the step S2.

In the step S6, when the target outlet temperature $T_O$ is lower than the predetermined value $T\alpha$ (such a condition often occurs just after a time when an ignition switch (not shown) is turned on in a summer daytime), the program proceeds to a step S13 wherein the set temperature $T_{PTC}$ is memorized in the CPU 31 as a $TM_{PTC}$. Furthermore, in a step S14, a cooling down control is carried out. This operation in the step S6 corresponds to a quick cooling command.

Figure 4:
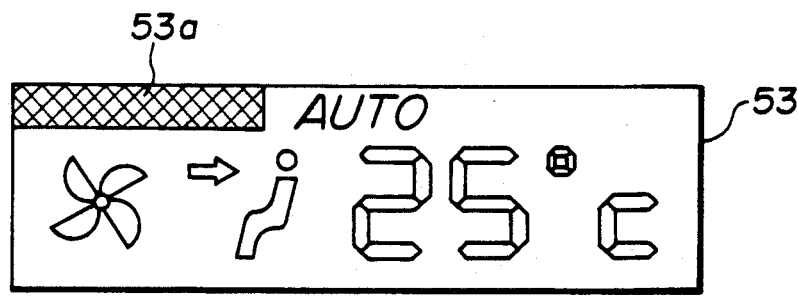
FIG. 4 is a front view of a control panel used in the air conditioner of FIG. 2.

The cooling down control is a control method in which a target temperature (a target inlet temperature) of air downstream of the evaporator 4 is transitorily set at a predetermined temperature lower than a temperature at which the evaporator 4 starts to be frozen, and in which the air mixing door 11 is operated to fully close the inlet of the heater unit 10 for preventing air from passing through the heater unit 11. By virtue of the lowering of the target inlet temperature, a solenoid current value $I_{SOL}$, which is changed by controlling the cooling capacity of the compressor, becomes small, and the cooling capacity of the compressor 2 is increased. With the above-mentioned control of the air mixing door 11, air from the blower fan 9 is carried into the passenger compartment through the outlet 12, 13 or 14 without being reheated by the heater unit 10. Accordingly, the temperature of the air is greatly lowered. In a step S15, an indicating signal is outputted to the indicating circuit 52 so that an indication "COOL", which shows that the air conditioner is in the quick cooling-down control condition, is turned on to flash at an indicating section 53a of the indicator 53 as shown in FIG. 4.

In a step S16, it is judged whether $|TM_{PTC}-T_{INC}|$ is smaller than 2° C. or not, wherein $T_{INC}$ is a present compartment temperature which is detected by a compartment temperature sensor 42. When the judgement in the step S16 is "no", the program proceeds to a step S17 wherein $T_{PTC}=TM_{QTC}$ is set in the memory of the CPU 31. Following this, the program returns to the step S6 and repeats the above-mentioned routine. When the judgement in the step S16 is "yes", which corresponds to the command to release the command of the quick cooling control, the program proceeds to a step S18 wherein the flashing indication "COOL" is turned off. Following this, the program proceeds to the step S12. In the step S6, when the cooling down control is in operation and the judgement is "no", the flashing indication "COOL" is turned off and the program proceeds to the step S7.

In the step S7, when the judgement is "yes" (such a condition is generally satisfied just after a time when the ignition switch is turned on in a winter season), the program proceeds to a step S19 wherein the blower fan 9 is stopped. In a step S20, an indication "FAN" is turned on to flash in the indicator 53 in order to indicate that the air conditioner is in the low water-temperature drive control. In a step S21, the program waits until a time when the engine cooling water temperature $T_W$ is raised 32° C. When the engine cooling water temperature $T_W$ is higher than or equal to 32° C., the air flow rate is gradually increased by gradually raising the applying voltage V to the blower fan 9 in accordance with time passing as shown in the step S22 of FIG. 5. When the applying voltage V has been raised to a predetermined value V1, the flashing indication "FAN" is turned off and the program proceeds to the step S12.

In the step S8, when To is larger than $T\beta$ (To > $T\beta$), the program proceeds to a step S24 and wherein the set temperature $T_{PTC}$ is memorized in the CPU 31 as $TM_{PTC}$. In a step S25, a warm-up control is started, that is, the air mixing door 11 is controlled so that all of the air blown by the blower fan 9 passes through the heater unit 10, and the applying voltage for the blower fan 9 is set at a maximum value. With this operation, the air flow rate by the blower fan 9 becomes maximum and the reheating capacity of the air becomes maximum, and the compartment temperature is quickly raised. Under this condition, the CPU 31 outputs a signal to the indicating circuit 52 in a step S26 so that an indication "HOT" is turned on in the indicator 53 in order to indicate that the air conditioner is in the warming-up control condition.

In a step S27, it is judged whether $|TM_{PCT}-T_{INC}|$ is lower than 2° C. ($|TM_{PCT}-T_{INC}|<2$) or not. When the judgement in the step S27 is "no", $T_{PTC}$ is memorized in the CPU 31 as $TM_{PTC}$ in a step S28 ($T_{PTC}=TM_{PTC}$) and the program returns to the step S8. When the judgement in the step S27 is "yes" (this judgement corresponds to the command to stop the warm-up control), the indication "HOT" is turned off in a step S29 and the program returns to the step S12. When the air conditioner is operated in a warm-up control and the judgement in the step S8 is "no", the indication "HOT" is turned off and the program proceeds to the step S9.

With the thus arranged procedure for the air conditioner, at a time just after the ignition switch is turned on in a summer daytime, the target outlet temperature To becomes smaller than the predetermined value $T\alpha$ (To < $T\alpha$). Therefore, the cooling down control is carried out. Furthermore, when $|TM_{PTC}-T_{INC}|$ becomes smaller than 2, the cooling down control is stopped. Thereafter, since the target outlet temperature. To becomes greater than or equal to the predetermined value $T\alpha$, the compressor 2, the air mixing door 11 and the blower fan 9 are controlled in accordance with the target outlet temperature To, that is, the air conditioner is operated in a normal auto-mode control. In operation of the cooling down control, the operating condition is indicated in the indicator 53 and the change of the set temperature is forbidden. That is to say, an initially set temperature $T_{PTC}$ is memorized in the CPU 31. Thereafter, even if a passenger in the passenger compartment operates the temperature set switch 23 so as to again set the set temperature to a lower value in order to more quickly get a properly cooled condition, the CPU 31 does not read the set temperature $T_{PTC}$. Accordingly, after the operation of the cooling down control, the initially set temperature $T_{PCT}$ remains in the memory of the CPU 31. Therefore, the air conditioner is operated so that the compartment temperature is adjusted at the initially set temperature $T_{PTC}$ without over-cooling the compartment. If the temperature set switch 23 is operated after stopping of the quick cooling-down control, a new set temperature $T_{PTC}$ is memorized in the CPU 31 and a new target outlet temperature To is calculated in accordance with the new set temperature $T_{PTC}$. That is to say, in a normal condition which is not in the quick cooling control or quick heating control, it is possible to renew the set temperature $T_{PCT}$.

On the other hand, at a time just after the ignition switch is turned on in the winter season, since the engine cooling water temperature $T_W$ is lower than 32° C. ($T_W<32$) and the ambient temperature $T_{AM}$ is lower than 15° C. ($T_{AM}<15$) in general, the above-mentioned low water-temperature drive control is carried out. When the engine cooling water temperature $T_W$ is greater than or equal to a predetermined value, the blower fan 9 is driven so that the air flow rate generated by the blower fan 9 is gradually increased. When the air flow rate becomes equal to or greater than a predetermined value, the air conditioner is operated to stop the low water-temperature drive control and to start the normal auto-mode control or warm-up control. In operation of the low water-temperature drive control, the operating condition is indicated in the indicator 53 and the change of the set temperature is forbidden. Therefore, even if a passenger operates the temperature set switch 23 to change the set temperature, the set temperature is not changed. After the stoppage of the low water-temperature drive control, it is possible to change the set temperature. Therefore, the CPU 31 reads a new set temperature and calculates a new target outlet temperature To.

When the target outlet temperature To is greater than the predetermined value $T\beta$ (To>$T\beta$), the warm-up control is started and the operating condition is indicated in the indicator 53. The warm-up control is stopped when $|TM_{PTC}-T_{INC}|<2$ is satisfied. Thereafter, the air conditioner is operated in an auto-mode control. When the air conditioner is operated in the warm-up control, the operating condition is indicated in the indicator 53 and the change of the set temperature is forbidden. After the stoppage of the warm-up control, it is possible to change the set temperature $T_{PTC}$. Therefore, the CPU 31 reads a new set temperature $T_{PTC}$ and calculates a new target outlet temperature To in accordance with the new set temperature.

Since the air conditioner is arranged to inform a passenger that it is impossible to reset the set temperature by indicating in the indicator the cooling down control, the warm-up control and the low water-temperature drive control, the passenger can be forewarned from wasting time by the changing operation of the set temperature in such control condition.

Although the content in the step S6 has been shown and described as being judged whether the outlet temperature To is lower than a predetermined value $T\alpha$ or not as shown in FIG. 5, it will be appreciated that the content in the step S6 may be changed into the following content: When the applying voltage to the blower fan 9 is greater than a predetermined value and the compartment temperature is greater than a predetermined value, the program proceeds to the step S13, and when the applying voltage is not greater than the predetermined value or the compartment temperature is not greater than the predetermined value, the program proceeds to the step S7.

Similarly, the content in the step S8 may be changed into the following content: When the applying voltage to the blower fan 9 is greater than a predetermined value and the compartment temperature is smaller than a predetermined value, the program proceeds to the step S24, and when the applying voltage to the blower fan 9 is not greater than a predetermined value or the compartment temperature is not smaller than a predetermined value, the program proceeds to the step S9.

Furthermore, it will be understood that the judgements in the steps S16 and S27 may not be restricted to this embodiment, and the cooling down control and the warm-up control may be operated for a predetermined time, or may be stopped at a time when the applying voltage to the blower fan 9 has become a predetermined value. Additionally, it will be understood that the control period of such controls may be determined in accordance with a proper combination of a passed time, an applying voltage and temperature.

While in this embodiment of the present invention the CPU 31 is designed so as not to read a new set temperature in operation of the cooling down control and the warm-up control, it will be appreciated that mechanical forbidden means may be applied to a mechanical temperature set switch when the controls of the present invention are applied to an air conditioner having the mechanical temperature switch such as a switch of a dial type or slide type.

Figure 6A:
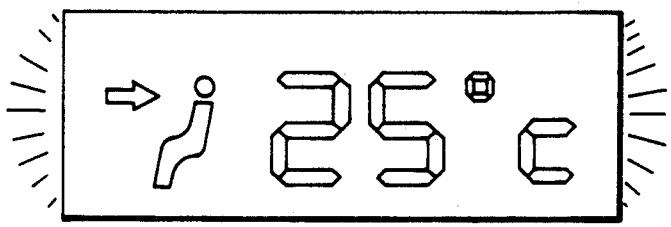
FIGS. 6A to 6C are parts of a flashing indicator which indicate various control states of the air conditioner of FIG. 2.
Figure 6B:
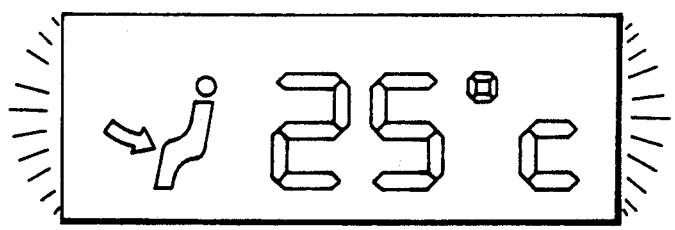
Figure 6C:
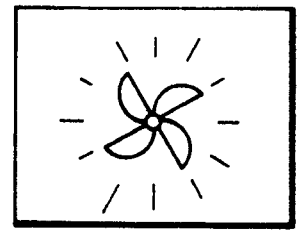

Although indications of the air conditioner operating condition have been shown and described as indicating indications "COOL" and "HOT" in the indicator, it will be understood that a conventional indicating pattern may be on-and-off lighted to inform a condition of the air conditioner as shown in FIGS. 6A to 6C. For example, the cool down control is informed by an on-and-off lighting of the indication shown in FIG. 6A, the warm-up control is formed by an on-and-off lighting of the indication shown in FIG. 6B, and a low water-temperature drive control is informed by an on-and-off lighting of the indication shown in FIG. 6C. Additionally, it will be understood that such control condition may be informed by electrical voice or sound.

What is claimed is:

1. An air conditioner for a vehicle comprising:
    means for setting a target value of a temperature of a passenger compartment;
    means for quickly adjusting the passenger compartment temperature in accordance with the compartment temperature target value, said quickly adjusting means takes an operative state and an inoperative state; and
    means for controlling the target value setting means to forbid the change of the compartment temperature target value in the operative state of said quickly adjusting means, and to allow the change of the preset target value in the inoperative state of said quickly adjusting means.

2. An air conditioner for a vehicle comprising:
    cooling means controllable of a cooling degree;
    means for setting a target value of a compartment temperature;
    means for commanding a quick cooling control, said quick cooling commanding means taking one of a commanding state and a command releasing state;
    means for regulating the cooling degree of said cooling means to regulating said cooling means to take a value greater than a predetermined value in the commanding state, and to take a value no greater than the predetermined value in the command releasing state; and
    means for controlling the target value setting means to forbid the change of the compartment temperature target value in the commanding state, and to allow the change of the compartment temperature target value in the command releasing state.

3. An air conditioner for a vehicle comprising:
    heating means controllable of a heating degree;
    means for setting a target value of a temperature of a passenger compartment;
    means for commanding a quick heating control, said quick heating commanding means taking one of a commanding state and a command releasing state;
    means for regulating the heating degree of said heating means to take a value greater than a predetermined value in the commanding state, and to take a value no greater than the predetermined value in the command releasing state; and means for controlling the target value setting means to forbid the change of the compartment temperature target value in the commanding state, and to allow the change of the compartment temperature target value in the command releasing state.

4. An air conditioner for a vehicle comprising:

a blower fan;

means for setting a target value of a temperature of a passenger compartment;

means for regulating said blower fan to take one of a first state and a second state, said blower fan regulating means regulating an air flow rate of said blower fan in the first state to be smaller than a first predetermined value until a temperature of a heat source of the air conditioner is raised to a second predetermined temperature, and in the second state to be changed in accordance with the target value; and means for controlling said target value setting means to forbid the change of the compartment temperature target value in the first state, and to allow the change of the compartment temperature target value in the second state.

5. An air conditioner as claimed in claim 1, further comprising informing means which informs a forbidden condition when the target value of said target value setting means is forbidden to change.

6. An air conditioner as claimed in claim 2, further comprising informing means which informs a forbidden condition when the target value of said target value setting means is forbidden to change.

7. An air conditioner as claimed in claim 3, further comprising informing means which informs a forbidden condition when the target value of said target value setting means is forbidden to change.

8. An air conditioner as claimed in claim 4, further comprising informing means which informs a forbidden condition when the target value of said target value setting means is forbidden to change.

9. An air conditioner as claimed in claim 2, wherein said cooling means includes a compressor whose discharge capacity is variable in accordance with said cooling degree.

* * * * *